UNITED STATES PATENT OFFICE

2,129,013

COPPER MONOCHLOROPHTHALOCYANINE AND A PROCESS OF MAKING IT

Reginald Patrick Linstead, London, and Charles Enrique Dent, Manchester, England, assignors to Imperial Chemical Industries Limited, a corporation of Great Britain No Drawing. Application May 14, 1936, Serial No. 79,816

4 Claims. (Cl. 260—314)

This invention relates to copper monochlophthalocyanine and a process of making it.

It is an object of this invention to prepare novel compounds of the above series, characterized by containing both copper and halogen in the molecule. It is a further object of this invention to provide an efficient process for producing said novel compounds. Other and further important objects of this invention will appear as the description proceeds.

In British patent specification No. 322,169 there is described a process for the production of blue to green coloring matters by heating phthalic anhydride with ammonia and certain metals or metal compounds including iron, cuprous chloride and nickel sulphide. In British patent specification No. 389,842 (corresponding to U. S. Patent No. 2,000,051) there is described a process for the production of nitrogen-containing coloring matters of complex constitution which comprises heating an o-cyanoarylcarboxyamide in the presence of specified metals and metal compounds. These coloring matters are described as purple to green in color and stated to appear to belong to one general class, this class appearing to include the said coloring matters of British patent specification No. 322,169.

We have now found that coloring matters of the same general series, but characterized by possessing both combined copper and halogen, may be obtained by simple treatment of o-arylene dicyanides.

The said treatment consists of heating a phthalonitrile in the presence of either cuprous or cupric halide at a temperature of at least 200° C.

We found, for instance, that when phthalonitrile is heated with cupric chloride at a temperature above 200° C., hydrochloric acid gas is evolved, and a bluish pigment results which corresponds in constitution to the empirical formula $C_{32}H_{15}ClN_8Cu$. This pigment has the same general properties as the other members of the phthalocyanine series, namely, it is typically greenish-blue in shade, but slightly greener than the simple copper-phthalocyanine which contains no halogen; it is scarcely soluble in the ordinary organic solvents, except basic solvents such as quinoline; but it dissolves readily in concentrated sulfuric acid, and is decomposed by nitric acid. It probably corresponds in structure to the ordinary copper phthalocyanine (see Jour. of the Chem. Soc., London, 1934, page 1035), except that one of the hydrogen atoms in one of the phenylene nuclei has been replaced by chlorine.

If phthalonitrile is heated with cuprous halide, for instance cuprous chloride, the reaction proceeds in two different manners depending on the temperature. At temperatures below 150° to 180° C., no hydrogen chloride is evolved, and the reaction product appears to be the simple copperphthalocyanine of the empirical formula $C_{32}H_{16}N_8Cu$. But when heated above 200° C., hydrogen chloride is evolved, and a chlorine-containing compound results. Evidently, the reaction proceeds in two stages, copper phthalocyanine and cupric chloride being produced in the first stage; in the second stage, the cupric chloride apparently acts upon additional phthalonitrile to produce the copper and chlorine-containing compound above discussed. The two reactions, under this theory, apparently follow the following equations:

(A) at 150 to 180° C.: 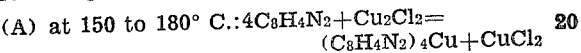

(B) above 200° C.: 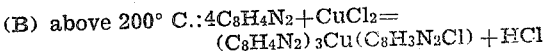

It is clear that the reaction product, where a cuprous salt is employed consists of a mixture of two phthalocyanines, one of which contains copper alone, and the other of which contains both copper and halogen.

While in the above we have not mentioned the use of any solvents, inert solvents may be employed, for instance naphthalene, chloronaphthalene or methylnaphthalene.

Without limiting our invention to any particular procedure, the following examples are given to illustrate our preferred mode of operation. Parts mentioned are by weight.

EXAMPLE 1

*Cuprous chloride and phthalonitrile in the ratio $1CuCl:4C_8H_4N_2$*

An intimate mixture of 12.8 parts of the nitrile and 2.5 parts of dry cuprous chloride was heated in a flask fitted with an air-condenser, a thermometer, and an inlet-tube for nitrogen, the last two reaching to the bottom. The flask was slowly heated in a bath while nitrogen was passed through it into a solution of silver nitrate. The course of the reaction has been described above. At its conclusion the flask was swept free from hydrogen chloride and the residue was broken up and boiled successively with alcohol, dilute sulfuric acid, alcohol, and ether. Yield of pigment, 9.95 parts. Upon anaylsis, this was found to contain 0.21 part of combined chlorine, which corresponds to 2.11%. Hence, the product is a mixture of the chlorinated and non-chlorinated compounds indicated in equations A and B above.

EXAMPLE 2

*Cupric chloride and phthalonitrile in the ratio $CuCl_2:4C_8H_4N_2$*

The chloride (dried at 100° C.) showed no sign of reaction with phthalonitrile below about 200° C. Hydrogen chloride was first evolved at an internal temperature of 200° C. and a bath-temperature of 215° C.; the temperature of the melt then rose very rapidly to 280° C. and the reaction was complete in 5 to 10 minutes. The product was isolated, by the same method as was used in the case of cuprous chloride, in yields of 80 to 90% (Equation B). It was purified by precipitation from a sulfuric acid solution in the manner already described, the recovery being 91 to 92% (Found: N, 18.0; Cl, 5.7; 6.1; Cu, 10.5. $C_{32}H_{15}N_8ClCu$ required N, 18.4; Cl, 5.8; Cu, 10.4%).

Copper monochlorophthalocyanine resembles the unsubstituted copper compound in general properties, but is very slightly greener in shade. When heated under reduced pressure, the substance decomposes with evolution of hydrogen chloride. On treatment with nitric acid, a yield of over 90% of a mixture of phthalimide and a chlorophthalamide is obtained, and the mother-liquor contains no chloride.

It will be understood that the procedure set forth is suspectible of wide variation and modification without departing from the spirit of this invention.

We claim:

1. The process of producing copper-monochlorophthalocyanine, which comprises causing phthalonitrile and cupric chloride to react at a temperature above 200° C. but below the temperature at which phalonitrile would carbonize.

2. The process of producing copper-monochlorophthalocyanine, which comprises heating phthalonitrile and cupric chloride in the ratio of substantially 4 moles of the former to 1 mole of the latter, at temperatures between 200 to 280° C., and recovering the coloring matter thus produced.

3. A coloring composition consisting essentially of pure copper-mono-chloro-phthalo-cyanine.

4. A coloring matter of the phthalocyanine series containing at least as a major part thereof a compound of the empirical formula $C_{32}H_{15}N_8ClCu$.

REGINALD PATRICK LINSTEAD.
CHARLES ENRIQUE DENT.